United States Patent [19]

Takeshima

[11] Patent Number: 5,172,550
[45] Date of Patent: Dec. 22, 1992

[54] CONTROL APPARATUS FOR AN INTERNAL COMBUSTION ENGINE

[75] Inventor: Shinichi Takeshima, Susono, Japan

[73] Assignee: Toyota Jidosha Kabushiki Kaisha, Toyota, Japan

[21] Appl. No.: 801,939

[22] Filed: Dec. 3, 1991

[30] Foreign Application Priority Data

Dec. 7, 1990 [JP] Japan .................. 2-406184

[51] Int. Cl.$^5$ ............................ F02M 25/07
[52] U.S. Cl. ...................... 60/278; 60/301; 123/571; 123/698
[58] Field of Search ............ 123/571, 698; 60/278, 60/285, 299, 301

[56] References Cited

U.S. PATENT DOCUMENTS

| | | | |
|---|---|---|---|
| 4,215,540 | 8/1980 | Kobayashi et al. | 60/278 |
| 4,233,811 | 11/1980 | Masaki | 60/278 |
| 4,297,328 | 10/1981 | Ritscher et al. | 60/301 X |
| 4,462,376 | 7/1984 | Ripper et al. | 123/571 X |
| 4,485,794 | 12/1984 | Kimberley et al. | 123/571 |
| 4,553,518 | 11/1985 | Takao et al. | 123/571 X |
| 4,598,684 | 7/1986 | Kato et al. | 123/571 X |
| 4,762,109 | 8/1988 | Jeenicke | 123/571 |
| 4,771,602 | 9/1988 | Ruiz et al. | 60/278 |
| 5,054,460 | 10/1991 | Ogita | 123/571 |

FOREIGN PATENT DOCUMENTS 63-283727 11/1988 Japan .
3-054343 3/1991 Japan .

*Primary Examiner*—Willis R. Wolfe
*Attorney, Agent, or Firm*—Kenyon & Kenyon

[57] ABSTRACT

A control apparatus for an internal combustion engine provided with a zeolite catalyst (6) capable of reducing NOx under oxidizing gas conditions includes an engine speed detecting sensor (11), an EGR control means (13), and an air-fuel ratio control means (16). The EGR control means (13) includes an EGR valve opening degree calculating means (15) for calculating an EGR valve opening degree based on air-fuel ratios which cause a current exhaust gas temperature to be in a predetermined temperature range at engine speeds lower than a predetermined engine speed and calculating an EGR valve opening degree which causes an amount of large molecular weight HC components in the exhaust gas to be more than a predetermined amount at engine speeds equal to or higher than the predetermined engine speed. The air-fuel ratio control means (16) includes an air-fuel ratio setting means (18) for setting a current air-fuel ratio to a lean air-fuel ratio calculated based on the EGR valve opening degree.

13 Claims, 11 Drawing Sheets

NE ×100rpm

|  | 8 | 12 | 16 | 20 | 24 | 28 | 32 | 36 | 40 | 44 | 48 |
|---|---|---|---|---|---|---|---|---|---|---|---|
| 21 | 0 | 0 | 0 | 0 | 0 | 0 | 0 | 0 | 0 | 0 | 0 |
| 29 | 2 | 4 | 6 | 6 | 6 | 6 | 4 | 3 | 2 | 2 | 0 |
| 37 | 5 | 6 | 7 | 10 | 10 | 10 | 7 | 4 | 3 | 2 | 0 |
| 45 | 5 | 7 | 10 | 15 | 15 | 15 | 15 | 6 | 3 | 3 | 0 |
| 52 | 7 | 8 | 10 | 15 | 15 | 15 | 15 | 7 | 4 | 3 | 0 |
| 60 | 4 | 6 | 7 | 9 | 9 | 9 | 7 | 5 | 4 | 3 | 0 |
| 68 | 1 | 2 | 3 | 3 | 4 | 4 | 2 | 2 | 1 | 1 | 0 |
| 76 | 0 | 0 | 0 | 0 | 0 | 0 | 0 | 0 | 0 | 0 | 0 |

PM ×10mmHg

MAP:A BEGR

MAP B

FIG. 12

MAP F: KEGR        NE ×100rpm

| | 10 | 12 | 16 | 20 | 24 | 28 | 32 | 36 | 40 | 44 | 48 |
|---|---|---|---|---|---|---|---|---|---|---|---|
| SMALL | 1.2 | 1.2 | 1.2 | 1.0 | 0.9 | 0.9 | 1.1 | 1.1 | 1.1 | 1.0 | 1.0 |
| MIDDLE | 1.2 | 1.1 | 1.0 | 0.9 | 0.8 | 0.9 | 1.2 | 1.2 | 1.0 | 1.0 | 1.0 |
| LARGE | 1.0 | 1.0 | 1.0 | 1.0 | 1.0 | 1.0 | 1.0 | 1.0 | 1.0 | 1.0 | 1.0 |

PM

CONTROL APPARATUS FOR AN INTERNAL COMBUSTION ENGINE

BACKGROUND OF THE INVENTION

1. Field of the Invention

The present invention relates to a control apparatus for an internal combustion engine capable of fuel combustion at lean air-fuel ratios (a lean burn engine) with an EGR (exhaust gas recirculation) system and with a zeolite catalyst for reducing NOx (a lean NOx catalyst) installed in an exhaust conduit of the engine.

2. Description of the Prior Art

It is known that a zeolite catalyst, when installed in an exhaust conduit of a lean burn engine, is effective to reduce nitrogen oxides (NOx) included in the exhaust gas of the engine when the engine is operated at lean air-fuel ratios. The zeolite catalyst needs hydrocarbons (HC), however, to reduce NOx under these oxidizing gas conditions, as disclosed in Japanese Patent Publication SHO 63-283727.

Though the exhaust gas itself includes HC, the amount of HC often is insufficient for the zeolite catalyst to effectively reduce NOx. To solve the problem of insufficient HC, Japanese Patent Publications HEI 1-186015 and HEI 2-51741 propose using exhaust gas recirculation (EGR).

More particularly, Patent Publication HEI 1-186015 discloses a procedure to execute EGR and to shift the air-fuel ratio toward the richer side within a lean air-fuel ratio range when the exhaust gas temperature is high and HC is directly oxidized, resulting in an insufficient HC condition. In this procedure, the EGR rate is increased at medium engine loads and medium engine speeds.

Patent Publication HEI 2-51741 discloses a procedure to execute EGR and to shift the air-fuel ratio toward the richer side within a lean air-fuel range during acceleration when a relatively large amount of HC is exhausted from the engine and therefore the HC amount is insufficient. In this procedure, the EGR rate (EGR amount) is increased when the exhaust gas temperature is high.

However, since the prior art only increases HC concentration of the exhaust gas, EGR is not effectively utilized for increasing a NOx purification rate of the lean NOx catalyst.

More particularly, the NOx purification rate of the lean NOx catalyst is significantly affected by not only the amount of HC supplied to the catalyst but also the composition of the HC and the catalyst temperature (or exhaust gas temperature). For example, when the exhaust gas temperature is low, small molecular weight HC (the carbon number of an HC molecule is equal to or less than 5) is effective to purify NOx, and when the exhaust gas temperature is high, large molecular weight HC (the carbon number of an HC molecule is equal to or more than 6) is effective to purify NOx. Regarding the size of an HC molecule, a small molecular weight HC is effective at low temperatures because the small molecular weight HC can be easily partial-oxidized at low temperatures to generate radicals capable of reducing NOx, while a large molecular weight HC is effective at high temperatures because the large molecular weight HC is cracked at high temperatures into small molecular weight HCs which in turn are partially oxidized to generate radicals. Regarding the catalyst temperature, the lean NOx catalyst has a temperature window where it can show a high NOx purification rate; the peak NOx purification rate is in the range of 400°-500° C.

Further, the composition of HC included in exhaust gas changes with a change of the engine speed (NE) and a change of the EGR rate. For example, when NE increases, the amount of large molecular weight HC in the exhaust gas decrease. When the EGR rate is increased, a large amount of large molecular weight HC is produced at high engine speeds, though the amount of large molecular weight HC does not change at low engine speeds. Further, in the lean burn engine, when the EGR rate is increased, the lean limit of the engine shifts toward the rich side. As a result, the air-fuel ratio has to be changed to a richer region of a lean air-fuel ratio range, and the exhaust gas temperature rises.

Thus, when the EGR rate is determined based on the HC concentration only, as in the prior art, the EGR is not utilized most effectively to purify NOx, because a change in the HC component due to the EGR and a change in the exhaust gas temperature due to the EGR are not taken into account.

SUMMARY OF THE INVENTION

An object of the invention is to provide a control apparatus for an internal combustion engine where the EGR rate is determined based not on a change in the HC concentration due to EGR but on a change in the HC component and a change in the air-fuel ratio due to EGR, so that the EGR is most effectively utilized in increasing the NOx purification rate of the lean NOx catalyst.

The above-described object can be attained by a control apparatus for an internal combustion engine in accordance with the present invention. The control apparatus includes an internal combustion engine capable of lean fuel combustion and having an exhaust conduit, a zeolite catalyst installed in the exhaust conduit and capable of reducing NOx under oxidizing gas conditions, an engine speed detecting sensor for detecting the engine speed, EGR control means including EGR valve opening degree calculating means for calculating an EGR valve opening degree, EGR valve drive means for driving an EGR valve, and air-fuel ratio control means including air-fuel ratio setting means. The EGR valve opening degree calculating means calculates an EGR valve opening degree based on an air-fuel ratio causing an exhaust gas temperature to be in a predetermined temperature range when the engine speed is lower than a predetermined speed, and calculates the EGR valve opening degree so that the amount of large molecular weight HC is greater than a predetermined value when the engine speed is equal to or higher than the predetermined speed. The air-fuel ratio setting means sets the air-fuel ratio to a lean air-fuel ratio that is determined based on the EGR valve opening degree.

In the above-described control apparatus for a lean burn engine, the air-fuel ratio is lean and NOx is purified by the lean NOx catalyst under oxidizing exhaust gas conditions. The EGR valve opening degree is calculated by the EGR control means and then the EGR is executed. The air-fuel ratio is controlled by the air-fuel ratio control means to a lean air-fuel ratio that is based on the the EGR valve opening degree.

More particularly, in a low engine speed range, the EGR valve opening degree is controlled to an opening degree determined based on the air-fuel ratio which causes the exhaust gas temperature to be within a predetermined temperature range. As a result, the catalyst temperature can be controlled to a temperature range where the high NOx purification rate of the lean NOx catalyst can be obtained.

In a high engine speed range, the EGR valve opening degree is controlled to an opening degree range which causes the amount of large molecular weight HC to be greater than a predetermined amount. As a result, a sufficient amount of large molecular weight HC is generated to purify NOx effectively even if the engine speed is high with resulting high exhaust gas temperature.

BRIEF DESCRIPTION OF THE DRAWINGS

The above and other objects, features, and advantages of the present invention will become more apparent and will be more readily appreciated from the following detailed description of the preferred embodiments of the invention taken in conjunction with the accompanying drawings, in which:

FIG. 12 is a table representation of a map used in calculating an EGR modification factor from engine speed and engine load in accordance with a third embodiment of the present invention;

DETAILED DESCRIPTION OF THE PREFERRED EMBODIMENTS

FIRST EMBODIMENT

Figure 1:
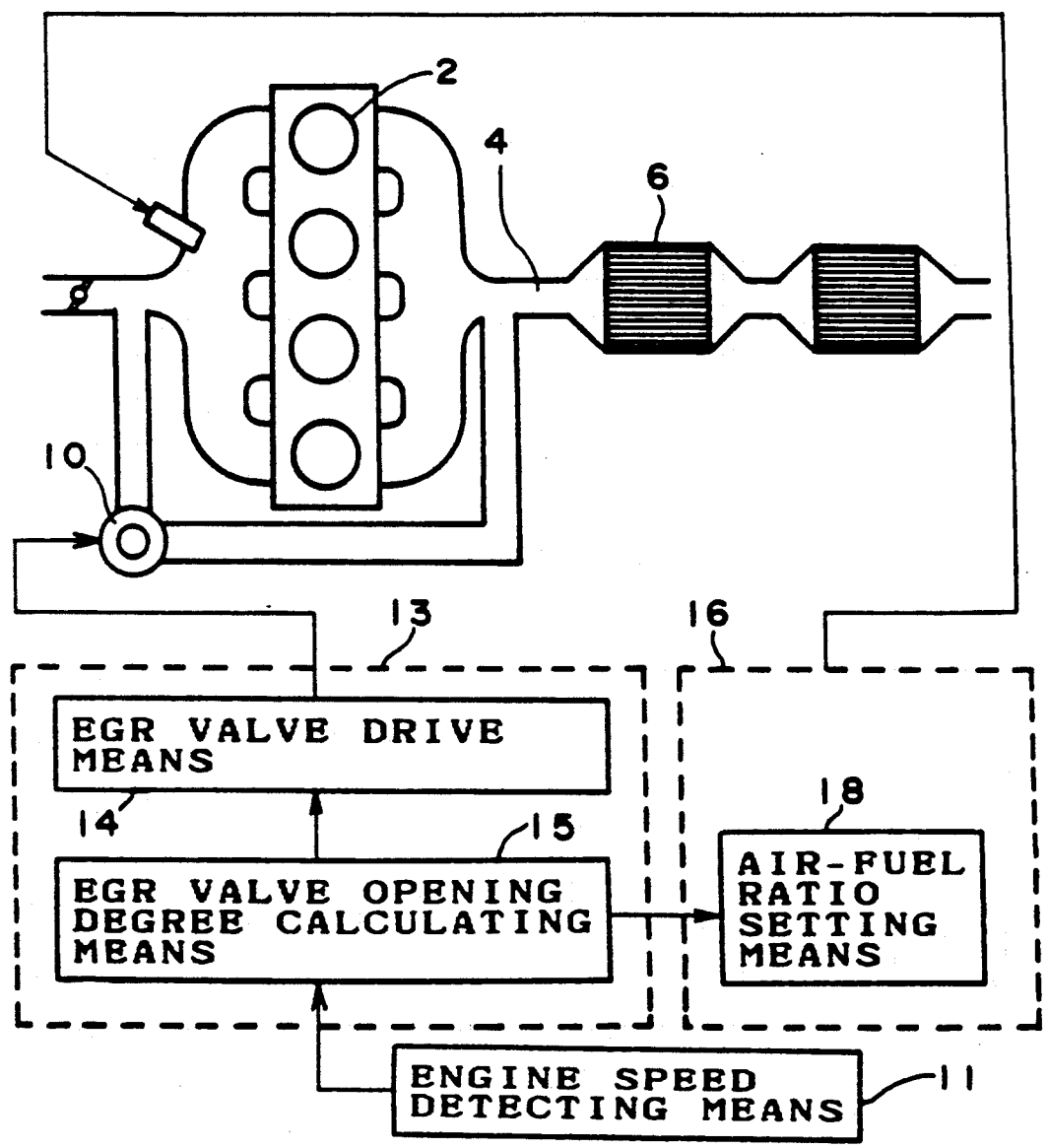
FIG. 1 is a system diagram of a control apparatus for an internal combustion engine applicable to any embodiment of the present invention.

As illustrated in FIG. 1, a control apparatus for an internal combustion engine in accordance with the first embodiment of the invention includes an internal combustion engine 2 capable of fuel combustion at lean air-fuel ratios (a lean burn engine), an exhaust conduit 4 of the engine 2, and a zeolite catalyst (a lean NOx catalyst) 6 capable of reducing nitrogen oxides (NOx) under oxidizing gas conditions in the presence of hydrocarbons. The control apparatus for an internal combustion engine further includes an engine speed sensor 11 for detecting a current engine speed (NE), an EGR control means 13, and an air-fuel ratio control means 16. The EGR control means 13 includes an EGR valve drive means 14 and an EGR valve opening degree calculating means 15. The EGR valve opening degree calculating means 15 calculates an EGR valve opening degree based on an air-fuel ratio which causes the exhaust gas temperature to be within a predetermined temperature range when the engine speed NE is lower than a predetermined engine speed, and calculates an EGR valve opening degree so that the amount of large molecular weight HC included in the exhaust gas is greater than a predetermined value when the engine speed NE is equal to or higher than the predetermined engine speed. The EGR valve drive means 14 drives an EGR valve so that the opening degree of the EGR valve is equal to the EGR valve opening degree calculated by the EGR valve opening degree calculating means 15. The air-fuel ratio control means 16 includes an air-fuel ratio setting means 18 which sets the air-fuel ratio of the engine to a lean air-fuel ratio that is determined based on the EGR valve opening degree.

Figure 2:
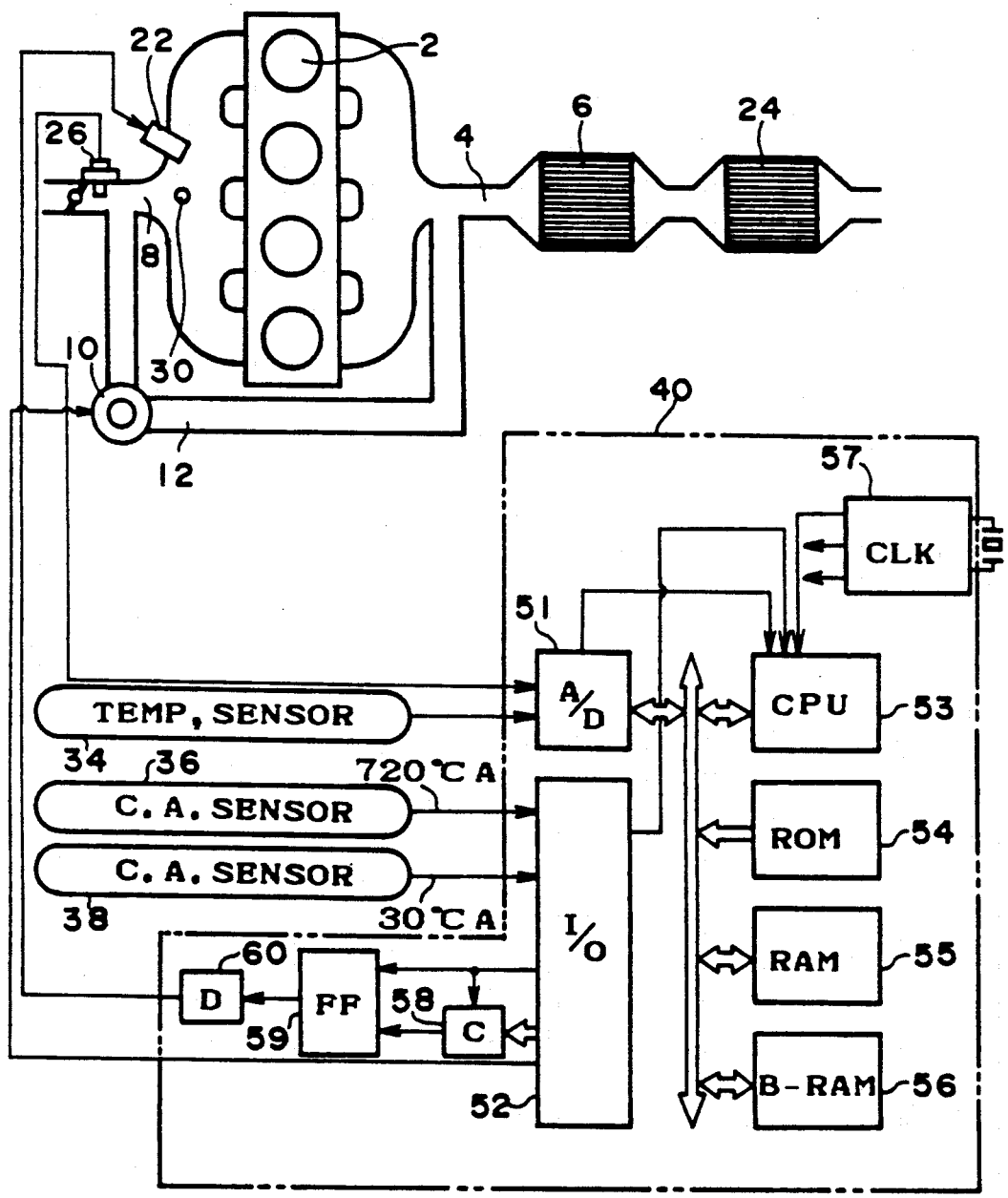
FIG. 2 is a more detailed system diagram of the control apparatus for an internal combustion engine of FIG. 1.

As illustrated in FIG. 2, the engine 2 has an intake conduit 8, and a pressure sensor 26 is installed in the intake conduit 8. The pressure sensor 26 is a semi-conductor type sensor which directly detects an intake pressure and generates an output signal of analog voltage which is in proportion to the intake pressure. The output signal is fed to an analog/digital converter of a control circuit 40. In a distributor (not shown), a first crank angle sensor 36 and a second crank angle sensor 38 are installed. At every 720° of crank rotation, the first crank angle sensor 36 generates a pulse signal which is used for a basic reference position for fuel injection control. The second crank angle sensor 38 generates a pulse signal at every 30° of crank rotation which is used as an interrupt signal for a central processor unit (CPU) 53 of the control circuit 40 and as a signal for a reference position for entering control routines of FIGS. 3 and 4. The signal from the second crank angle sensor 38 is also used for calculating a current engine speed, and therefore the second crank angle sensor 38 constitutes the engine speed detecting means 11 (FIG. 1). These pulse signals of the crank angle sensors 36 and 38 are fed to an input/output interface 52 of the control circuit 40.

In the intake conduit 8, a fuel injection valve 22 is provided for each cylinder and supplies pressurized fuel to each intake port. In a water jacket formed in a cylinder block of the engine 2, a water temperature sensor 34 is provided to detect the engine cooling water temperature. The water temperature sensor 34 generates an analog voltage which is in proportion to the engine cooling water temperature THW. The output signal of the water temperature sensor 34 is fed to an analog/digital converter 51. An actuator for driving an EGR valve 10 houses a step motor which is controlled by an output signal from the input/output interface 52 of the control circuit 40.

The zeolite catalyst (lean NOx catalyst) 6 installed in the exhaust conduit 4 of the engine 2 is constructed of zeolite carrying at least one kind of metal selected from the group of transition metals and noble metals and reduces NOx under oxidizing gas conditions (that is, in exhaust gas at lean air-fuel ratios) in the presence of hydrocarbons (HC). Downstream of the lean NOx catalyst 6, an oxidizing catalyst 24 for oxidizing HC and CO at high purification rates is installed. The oxidizing catalyst 24 may be replaced by a three-way catalyst.

The control circuit 40 is constituted by a micro computer that includes a read-only memory (ROM) 54, a random access memory (RAM) 55, a back-up RAM 56, and a clock generation circuit 57, in addition to the analog/digital converter 51, the input/output interface 52, and the CPU 53. A down-counter 58, a flip-flop 59, and a drive circuit 60 are further included in the computer 40 so as to control the fuel injection valve 22. More particularly, in a control routine which will be explained in more detail hereinafter, when a fuel injection amount TAU is calculated, the TAU is preset in the down-counter 58 and the flip-flop 59 is set also. As a result, the drive circuit 60 starts biasing of the fuel injection valve 22. When the down-counter 58 counts the clock signals until a borrow-out terminal is at "1" level, the flip-flop 59 is set and the drive circuit 60 stops the biasing of the fuel injection valve 22. Thus, the fuel injection valve 22 is biased for the period of time corresponding to the amount of fuel injection amount TAU, and therefore fuel corresponding to the amount TAU is fed to the combustion chamber of the internal combustion engine 2. The CPU 53 is entered when the input/output interface 52 receives a pulse signal from the crank angle sensor 38 and an entrance instruction signal from clock generation circuit 57.

The intake pressure data PM, the engine cooling water temperature data THW, and the exhaust gas temperature data TEX are stored in the RAM 55 and are renewed at predetermined crank angles. The engine speed data NE are calculated at every 30° crank angle and stored in the RAM 55.

The control routine stored in and executed by the computer 40 will now be explained with reference to FIGS. 3 and 4.

Figure 3:
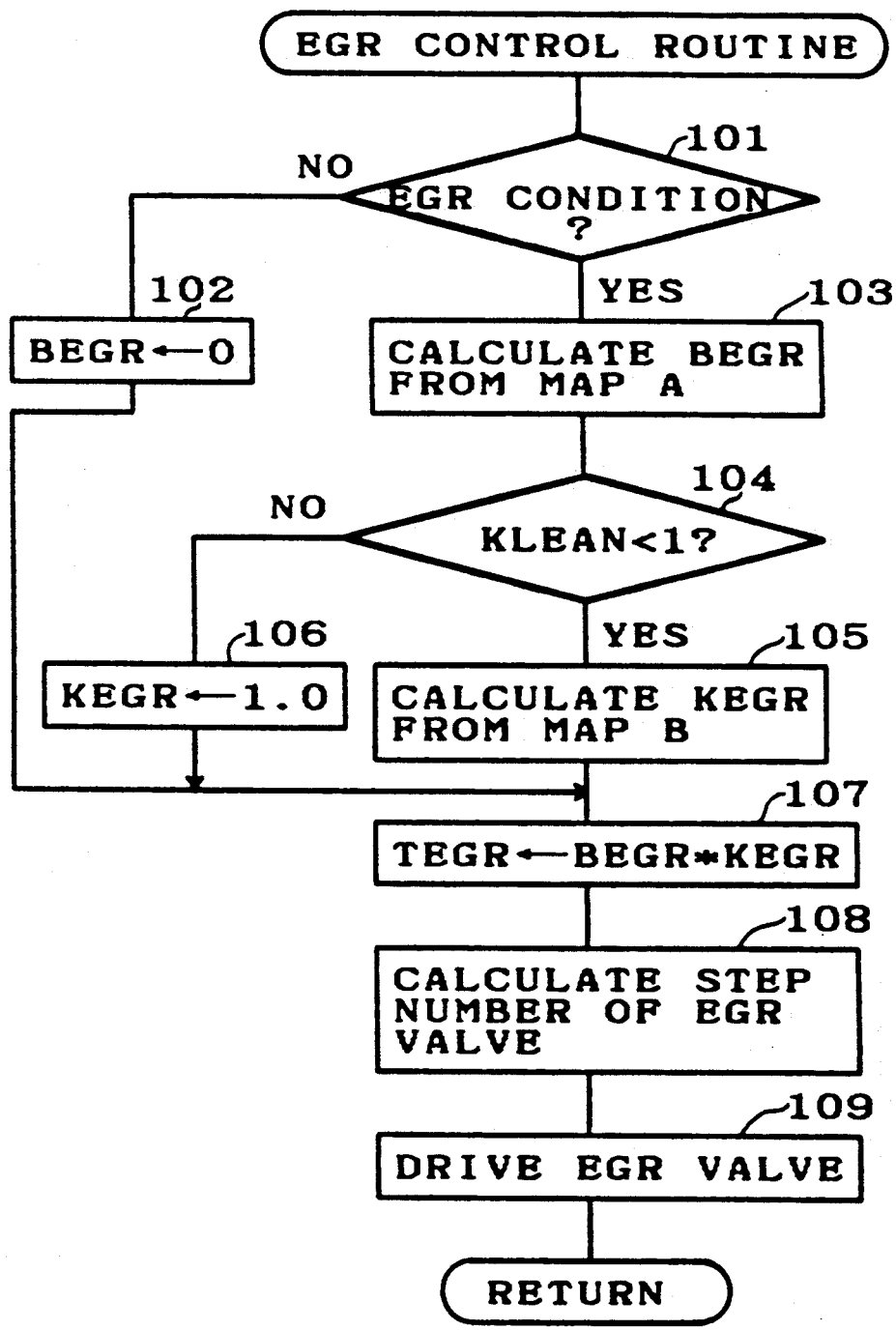
FIG. 3 is a flow chart for EGR control used in a control apparatus for an internal combustion engine in accordance with a first embodiment of the present invention.

FIG. 3 illustrates an EGR control routine which constitutes the EGR control means 13 of FIG. 1. The EGR control routine is entered at predetermined crank angles, for example at every 30° C. crank angle. At step 101, it is determined whether or not the EGR condition is satisfied. For example, if the engine is warmed-up (for example, when THW is determined to be larger than 80 ° C.) and the throttle valve is not full-closed, it can be deemed that the EGR condition is satisfied. When it is determined at step 101 that the EGR condition is not satisfied, the routine proceeds to step 102, where a basic EGR rate BEGR is set to "0".

Figures 7, 8:
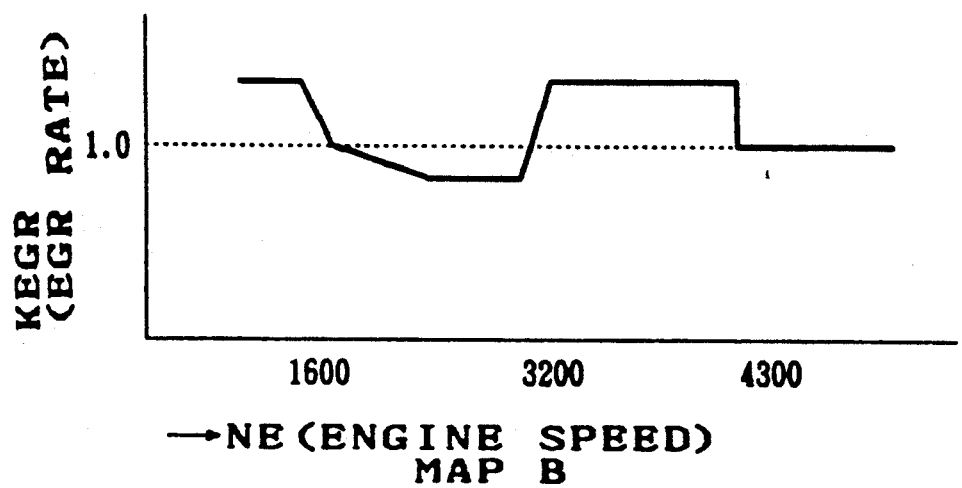
FIG. 7 is a table representation of a map used in calculating a basic EGR rate from an engine load and an engine speed.
FIG. 8 is a graphical representation of a map used in calculating an EGR modification factor from an engine speed in accordance with the first embodiment of the present invention.

When it is determined at step 101 that the EGR condition is satisfied, the routine proceeds to step 103, where the basic EGR rate BEGR is calculated from the engine load (intake pressure PM) and the engine speed NE using map A (see FIG. 7). The EGR rate values of map A are determined through experiment so that both improvement of fuel economy and drive feeling and decrease in the NOx exhaust amount are achieved. Usually, the EGR rate value is high at medium engine loads and medium engine speeds. Then, the routine proceeds to step 104.

At step 104, it is determined whether or not a lean modification factor KLEAN is smaller than 1.0, namely, whether or not the engine is operated at lean air-fuel ratios. If KLEAN is smaller than 1.0, the routine proceeds to step 105, and if KLEAN is equal to or larger than 1.0, the routine proceeds to step 106.

At step 105 where the engine is operated at lean air-fuel ratios, an EGR modification factor KEGR is calculated so that the optimum EGR for the lean NOx catalyst 6 is executed. More particularly, the EGR modification factor KEGR is calculated from the engine speed NE using map B (see FIG. 8). The EGR modification factor KEGR is a modification factor for modifying the basic EGR rate BEGR to an EGR rate which causes the amount of large molecular weight HC included in exhaust gas to be greater than a predetermined amount when the engine speed is high, and for modifying the basic EGR rate BEGR to an EGR rate determined based on the air-fuel ratios which cause the lean NOx catalyst 6 to show a high NOx purification rate when the engine speed is low. The step 105 and map B of FIG. 8 constitute the EGR valve opening degree calculating means 15 of FIG. 1.

In the first embodiment, the EGR modification factor KEGR is larger than 1.0 at high engine speeds (higher than 3,200 rpm) and is smaller than 1.0 at medium engine speeds as shown in map B of FIG. 8. Since the EGR rate is set large at high engine speeds, the amount of large molecular weight HC (HC molecule having a number of carbon atoms equal to or larger than 6, for example, toluene, iso-octane, and xylene) is increased to an amount more than 800 ppm. At very high engine speeds (higher than 4,300 rpm), the EGR modification factor KEGR is set at 1.0 so that the exhaust gas temperature is prevented from rising to an excessive temperature and thermal degradation of the lean NOx catalyst 6 is suppressed.

At low engine speeds, since the exhaust gas temperature is usually low, the EGR modification factor KEGR is increased so that the air-fuel ratio is changed to the richer portion of a lean air-fuel ratio range and the exhaust gas temperature upstream of and in the vicinity of the lean NOx catalyst 6 is increased to a temperature higher than 380 ° C.

At medium engine speeds, the exhaust gas temperature is usually high. If the EGR rate were set large and the air-fuel ratio were set at the richer portion of the lean air-fuel ratio range, the exhaust gas temperature would rise above the optimum temperature where the lean NOx catalyst can show a maximum NOx purification rate. Therefore, the EGR rate is decreased and the air-fuel ratio is set at a lean portion of the lean air-fuel ratio range so that the exhaust gas temperature is lower than 520 ° C. upstream of and in the vicinity of the lean NOx catalyst 6. Such KEGR values are determined through experiment.

At step 106, the EGR modification factor KEGR is set to 1.0. Then, at step 107, a target EGR rate TEGR is calculated by multiplying the basic EGR rate BEGR by the EGR modification factor KEGR.

At step 108, an EGR valve opening degree (a pulse step number) for achieving the target EGR is calculated from the target EGR rate TEGR. Then, at step 109, the EGR valve is driven to the target opening degree. Then, the routine returns. In this connection, the step 109 constitutes the EGR valve drive means of FIG. 1.

Figure 4:
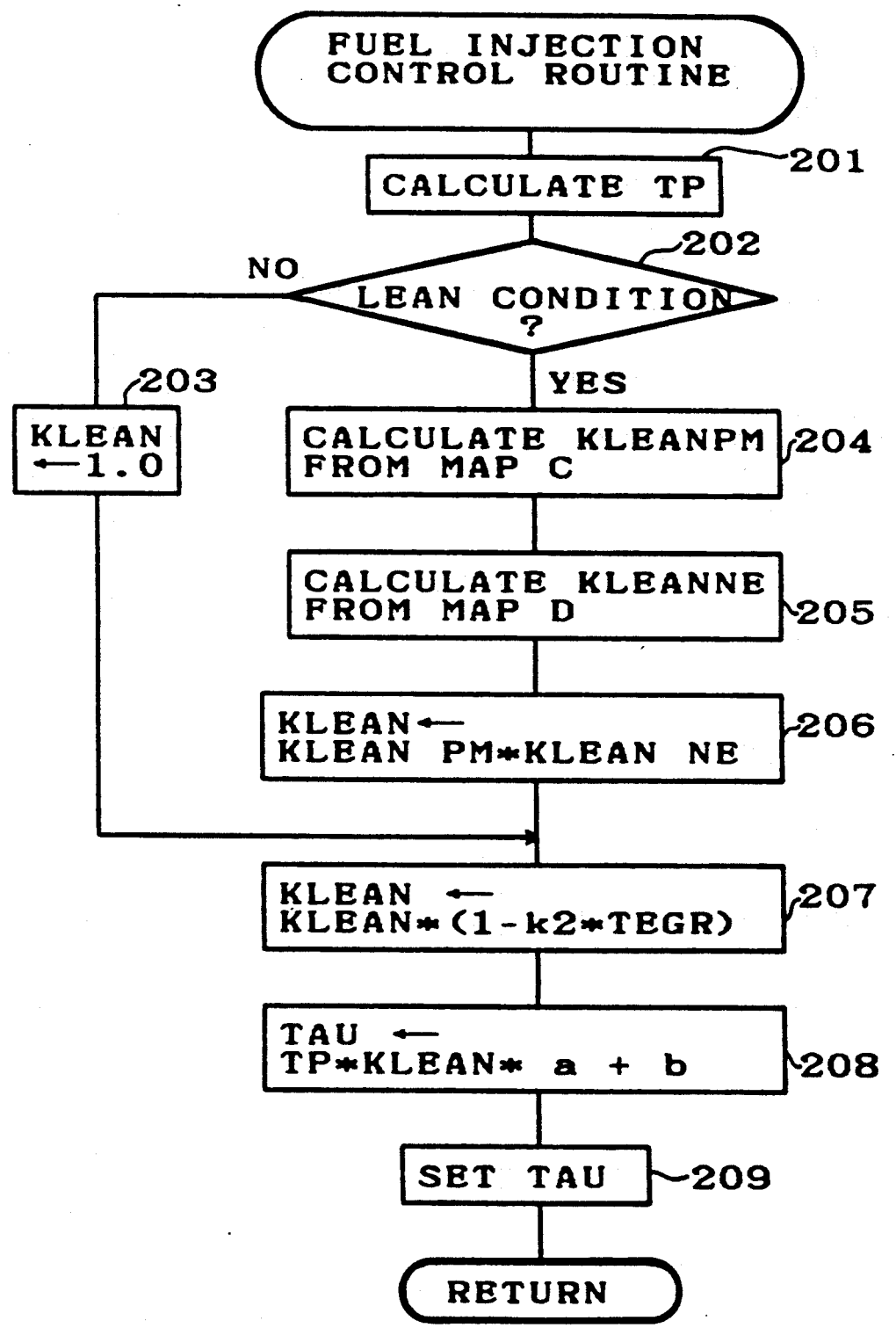
FIG. 4 is a flow chart for fuel injection used in the control apparatus for an internal combustion engine in accordance with the first embodiment of the present invention.

FIG. 4 illustrates a routine for controlling fuel injection to control the air-fuel ratio. The air-fuel ratio control routine of FIG. 4 constitutes the air-fuel ratio control means 16 of FIG. 1. The routine is entered at every 30° C. crank angle.

At step 201, a basic fuel injection amount TP is calculated from the current engine load PM, the current engine speed NE, and the target EGR rate TEGR. More particularly, a usual basic fuel injection amount TPB is calculated from a two-dimensional map of PM and NE and the basic TPB is modified by the target EGR rate TEGR using the following equation:

$$TP = TPB \times (1 - k1 \times TEGR)$$

where, k1 is a constant.

At step 202, it is determined whether a lean operating condition is satisfied or not. For example, a condition where a current engine cooling water temperature is higher than a predetermined temperature (for example, 80° C.) can be considered to be a lean operating condition. When the current operating condition is determined to be not a lean operating condition at step 202, the routing proceeds to step 203, and when the current operating condition is determined to be a lean operating condition at step 202, the routine proceeds to step 204.

Figure 9:
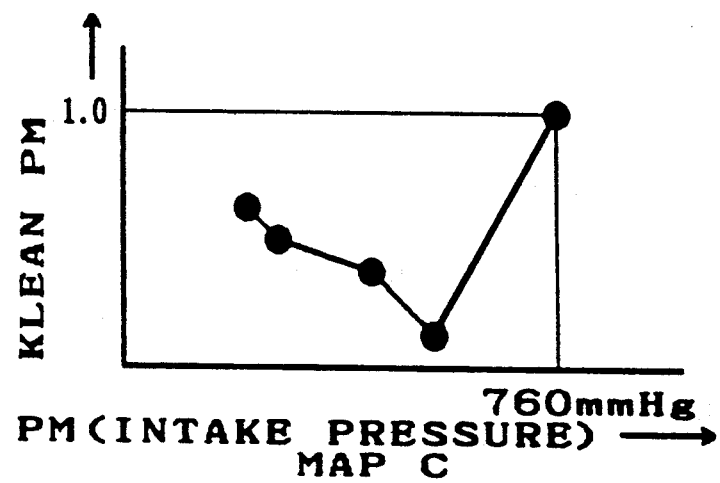
FIG. 9 is a graphical representation of a map used in calculating a lean modification factor from engine speed.
Figure 10:
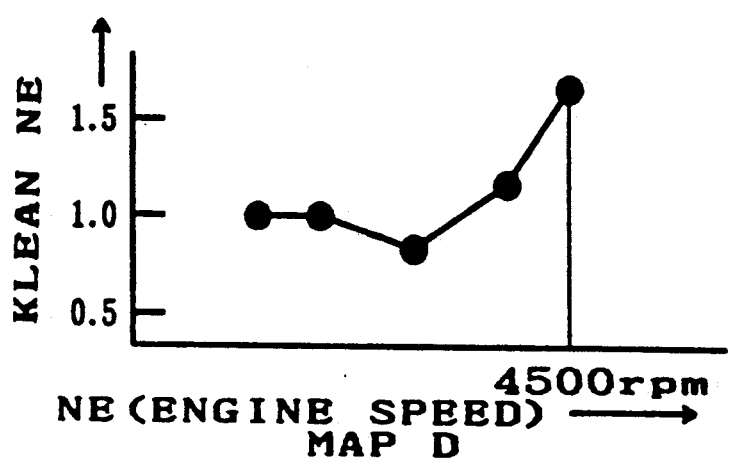
FIG. 10 is a graphical representation of a map used in calculating a lean modification factor from engine load.

At step 203, the lean modification factor KLEAN is set to 1.0. At step 204, a factor KLEANPM is calculated based on the engine load PM using map C (see FIG. 9), and the routine proceeds to step 205 where a factor KLEANNE is calculated based on the engine speed NE using map D (see FIG. 10). Then, at step 206, the lean modification factor KLEAN is calculated using the following equation:

$$KLEAN = KLEAPM * KLEANNE$$

This factor KLEAN is a factor for realizing a good fuel economy and an excellent drive feeling. Usually, KLEAN takes a small value at medium engine loads and medium engine speeds.

At step 207, KLEAN is modified by TEGR using the following equation:

$$KLEAN = KLEAN * (1 - k2 * TEGR)$$

where, k2 is a constant. The reason why the above-described modification is made is as follows: When EGR is executed, a lean limit (where a significant torque variance begins to occur) shifts toward the lean side. Therefore, the air-fuel ratio is required to be changed to a richer side in the lean air-fuel ratio range when the EGR rate value is large. The step 207 constitutes the air-fuel ratio setting means 18 of FIG. 1.

At step 208, a final fuel injection amount TAU is calculated using the following equation:

$$TAU = TP * KLEAN * a + b$$

where,
a is a constant for engine warming-up modification, and
b is a constant for acceleration modification.

Then, at step 209, the fuel injection amount TAU is set in the down-counter 58 and the flip-flop 59 is set so that fuel injection begins. When a time period corresponding to TAU has elapsed, the flip-flop 59 is reset by the borrow-out signal of the down-counter 59 so that the fuel injection of the cycle finishes.

Operation of the apparatus in accordance with the first embodiment will not be explained. In the control where both lean burn and EGR are executed, the air-fuel ratio and the EGR rate are determined so that all of fuel economy, drive feeling, and NOx exhaust amount are optimized at every engine operating state. If the control were not optimized, when the EGR rate is increased for the purpose of reducing the NOx amount, a large torque fluctuation would occur. In turn, when the air-fuel ratio is controlled to the richer portion of the lean air-fuel ratio range for the purpose of preventing the large torque fluctuation, then the fuel economy would be degraded. The above-optimized condition is achieved by calculating KLEAN (see step 206 of FIG. 4) from map C (FIG. 9) and map D (FIG. 10), which are determined through experiment, and then modifying the KLEAN at step 207 of FIG. 4 so that the air-fuel ratio is changed in accordance with a change in the EGR rate.

In the first embodiment, when the engine is operated at lean air-fuel ratios (namely, KLEAN is smaller than 1.0), the basic EGR rate BEGR is modified by the modification factor KEGR at steps 105-107, the EGR rate and the air-fuel ratio (more exactly, the exhaust gas temperature in accordance with the air-fuel ratio) are controlled so that the NOx purification rate of the lean NOX catalyst 6 is optimized.

More particularly, at a high engine speed range where the amount of large molecular weight HC is small, the large molecular weight HC is increased by increasing the EGR rate. As a result, at the high engine speed range where exhaust gas temperature is high, the increased large molecular weight HC effectively increases the NOx purification rate of the lean NOxc analyst 6. At a very high engine speed (higher than 4,300 rpm), the EGR rate modification (therefore, the air-fuel modification) is not made. This prevents the temperature of the zeolite catalyst from rising to a point that would cause thermal degradation of the catalyst.

At a low engine speed range, since the EGR rate is increased and the air-fuel ratio is set at the richer portion of the lean air-fuel ratio range so that the exhaust gas temperature is increased, the catalyst temperature is also increased to approach the peak NOx purification rate temperature so that the NOx purification rate of the lean NOx catalyst 6 is increased. Further, since the EGR rate is large, the amount of NOx exhausted from the engine is small.

At a medium engine speed range, since the EGR rate is decreased and the air-fuel ratio is set to the lean side of the lean air-fuel ratio range, the exhaust gas temperature is lowered and the catalyst temperature approaches the peak NOx purification rate temperature so that the NOx purification rate of the lean NOx catalyst 6 is increased. In that range, though the HC concentration decreases and the amount of NOx exhausted from the engine increases, an increase in the NOx purification rate due to the decrease in the exhaust gas temperature is larger than a decrease in the NOx purification rate due to the HC concentration decrease and the NOx exhaust amount increase so that the amount of NOx exhausted to the environment is decreased.

SECOND EMBODIMENT

Figure 11:
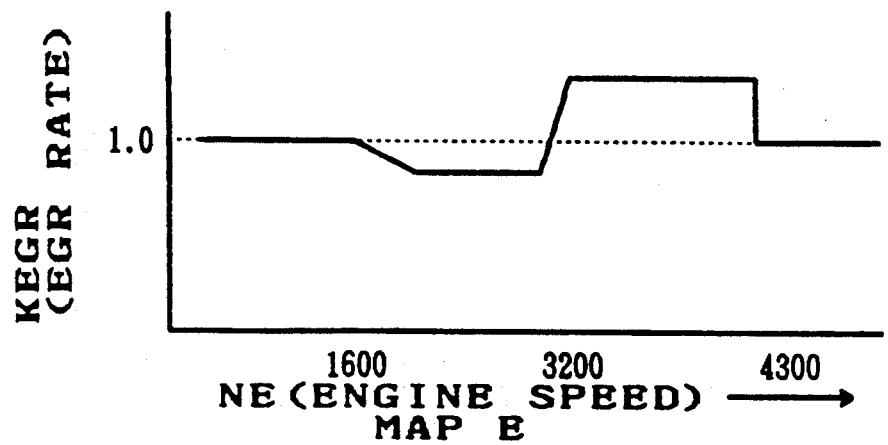
FIG. 11 is a graphical representation of a map used in calculating an EGR modification factor from engine speed in accordance with a second embodiment of the present invention.

Since the second embodiment differs from the first embodiment in that map B in the first embodiment is replaced by map E (see FIG. 11) in the second embodiment, only map E will be explained below.

Map E differs from map B in that the EGR modification factor KEGR is set at 1.0 at a low engine speed (lower than 1,600 rpm) in map E. Since the amount of NOx exhausted from the engine is sufficiently small at low engine speeds, the exhaust gas temperature need not be increased. Therefore, the air-fuel ratio modification at low engine speeds is not made in the second embodiment. As a result, the fuel economy is improved in the second embodiment compared with the first embodiment. Other structures and operation of the second embodiment are the same as those of the first embodiment.

THIRD EMBODIMENT

In the third embodiment, the EGR modification factor KEGR is calculated from the engine speed NE and the engine load PM, so that the NOx purification rate of the lean NOx catalyst 6 is improved at every engine operating condition. The third embodiment differs from the first embodiment in the calculation method of the factor KEGR at step 105 of FIG. 3.

In the third embodiment, the EGR modification factor KEGR is calculated from both NE and PM using map F (see FIG. 12). In map F, KEGR is set at 1.0 at high engine loads where a PM value is large. This is because engine power has priority over NOx purification rate of the lean NOx catalyst at high engine loads and because degradation of the lean NOx catalyst due to heat, which would occur if the EGR rate were set to a value larger than 1.0, should be avoided.

At medium engine loads, the highest engine speed at which KEGR can be set to larger than 1.0 is 1,200 rpm, while such an engine speed is 1,600 rpm at low engine loads. This is because the exhaust gas temperature is higher at medium engine loads than at low engine loads. As a result, since the air-fuel ratio can be set at a richer portion of the lean air-fuel ratio range at a low engine speed, both improvement of the NOx purification rate of the lean NOx catalyst 6 and improvement of the fuel economy are achieved at medium engine loads.

Further, the values of KEGR in the higher engine speed portion of the medium engine load range differ from and are set larger than those in the low engine load range. This is because the exhaust gas temperature is higher at medium engine loads than at low engine loads so that less large molecular weight HC tends to be generated at medium engine loads. At a very high engine speed, KEGR is reduced to 1.0 at a lower engine speed in the medium engine load range than in the low engine load range, because the exhaust gas temperature reaches the durability limit temperature of the lean NOx catalyst at a lower engine speed at medium engine loads than at low engine loads. As a result, the NOx purification rate of the lean NOx catalyst 6 can be increased both at medium and low engine loads. Other structures and operation of the third embodiment are the same as those of the first embodiment.

FOURTH EMBODIMENT

In the fourth embodiment, the EGR valve opening degree (pulse step number) is calculated directly, without calculating the EGR rate, using an EGR valve opening degree map (see FIG. 13) which includes EGR rate values capable of increasing the NOx purification rate of the lean NOx catalyst 6.

Figure 5:
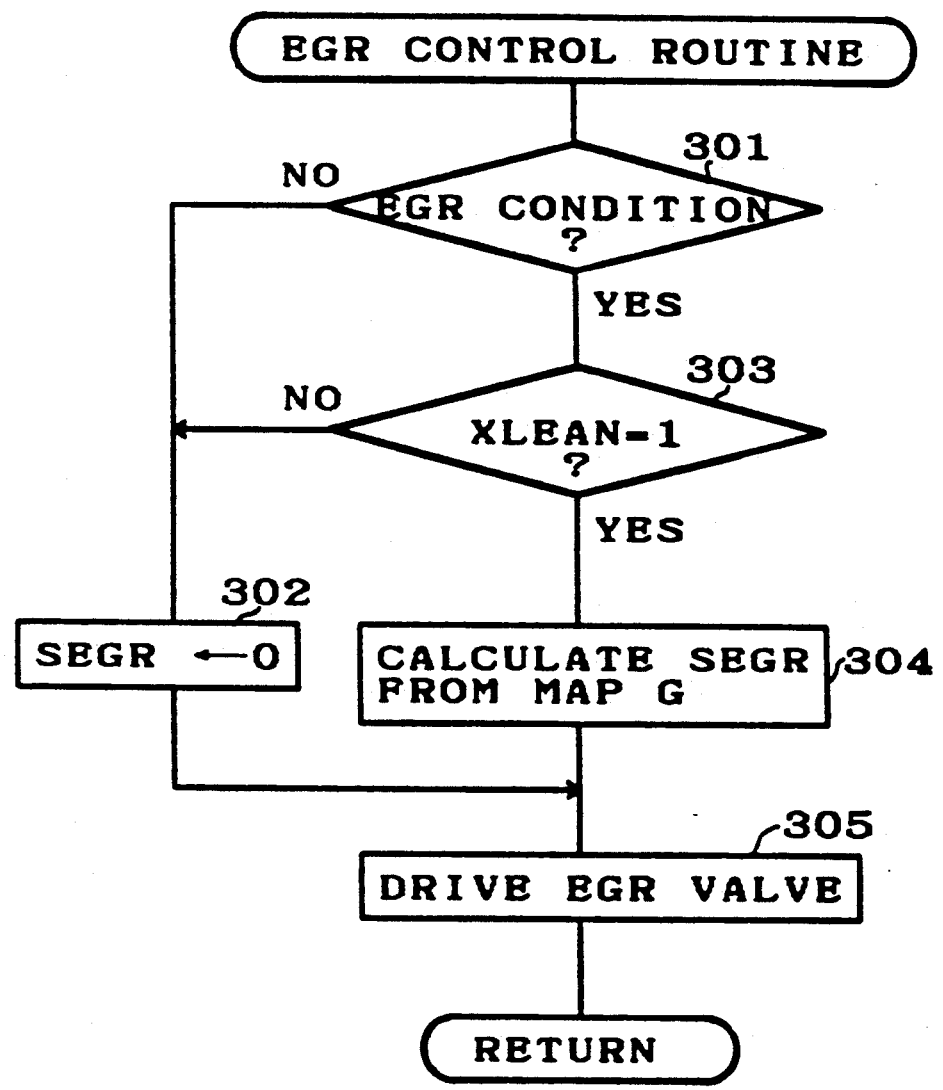
FIG. 5 is a flow chart for EGR control used in a control apparatus for an internal combustion engine in accordance with a fourth embodiment of the present invention.

FIG. 5 illustrates an EGR control routine for the fourth embodiment which is entered at predetermined crank angles. Step 301 is a step for determining whether or not an EGR condition is satisfied, like step 101 of the first embodiment. When it is determined at step 301 that the EGR condition is not satisfied, the routine proceeds to step 302 where the EGR valve opening degree SEGR (pulse step number) is set to 0 (full close). When it is determined at step 301 that the EGR condition is satisfied, the routine proceeds to step 303.

At step 303, it is determined whether flag XLEAN, which is renewed in a fuel injection amount control routine for the fourth embodiment (FIG. 6) described hereinafter, is 1 or not. When XLEAN is determined to be 1 at step 303, the engine operating condition can be deemed to be a lean condition and the routine proceeds to step 304. When XLEAN is determined to be 0 at step 303, the operating condition is not a lean condition and the routine proceeds to step 302 where an EGR valve opening degree SEGR is set to 0 (full close).

Figure 13:
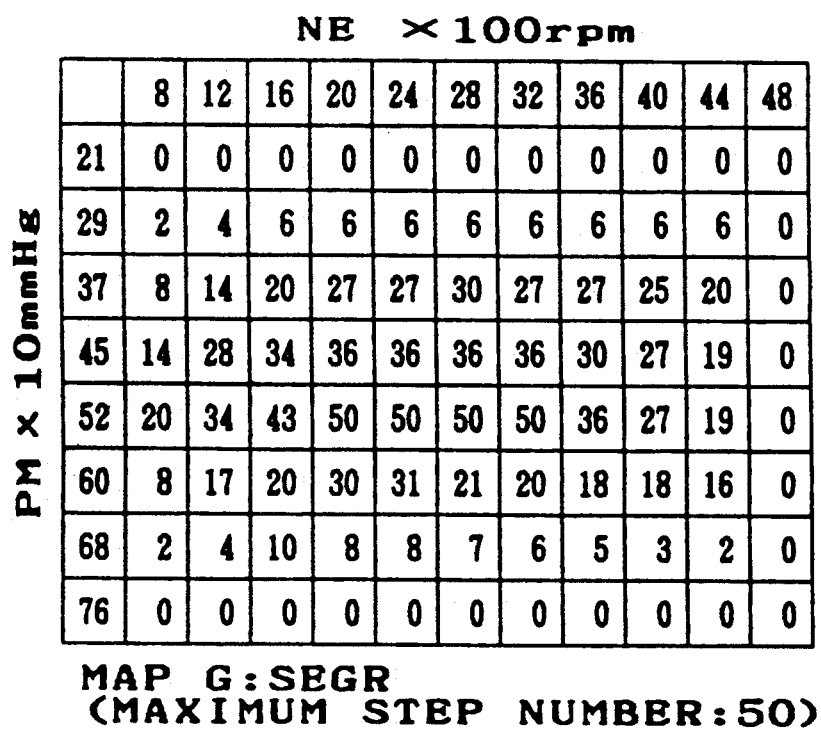
FIG. 13 is a table representation of a map used in calculating an EGR valve opening degree from engine speed and engine load in accordance with a fourth embodiment of the present invention.
Figure 14:
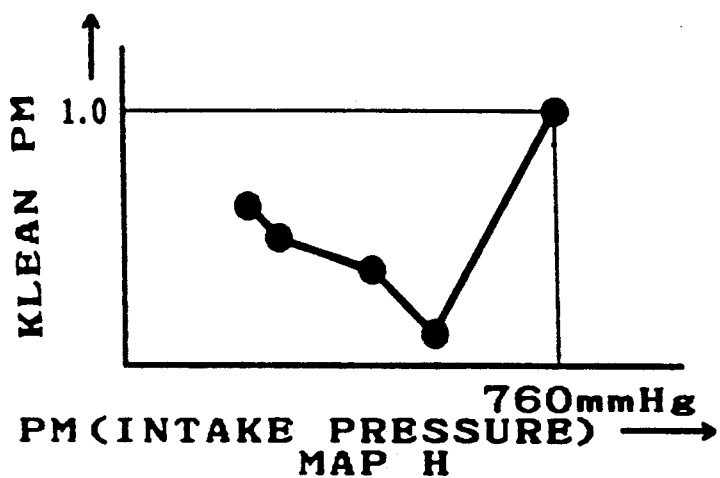
FIG. 14 is a graphical representation of a map used in calculating a lean modification factor from engine load in accordance with the fourth embodiment of the present invention.
Figure 15:
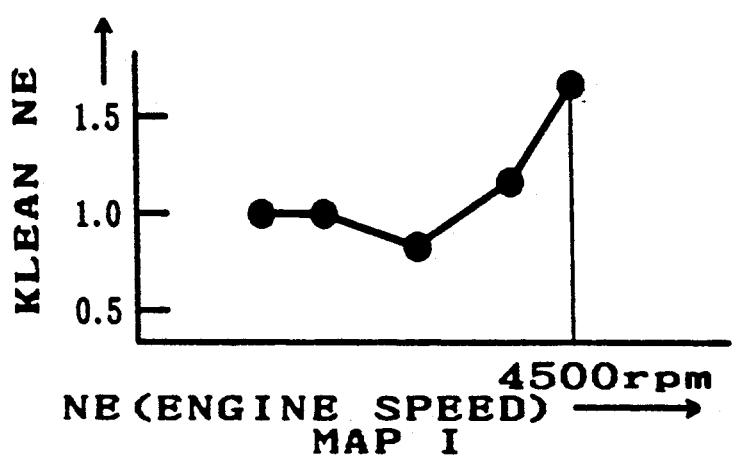
FIG. 15 is a graphical representation of a map used in calculating a lean modification factor from engine speed in accordance with the fourth embodiment of the present invention.

At step 304, the EGR valve opening degree SEGR is calculated from the engine load PM and the engine speed NE using map G (see FIG. 13). This map G is a map for realizing an EGR opening degree where the NOx purification rate of the lean NOx catalyst 6 is optimized and is made through experiment. More particularly, the EGR valve opening degree values in map G are determined so as to satisfy the following: at low engine speeds, when the air-fuel ratio is set to an air-fuel ratio which causes the exhaust gas temperature to be higher than 380° C. upstream of and in the vicinity of the lean NOx catalyst, both a small torque fluctuation and a small NOx exhaust amount are obtained; at medium engine speeds, when the air-fuel ratio is set to an air-fuel ratio which causes the exhaust gas temperature to be lower than 520° C., both a small torque fluctuation and a small NOx exhaust amount are obtained; and at high engine speeds, the large molecular weight HC (number of C atoms is equal to or larger than 6) is included in the exhaust gas by an amount more than 800 ppm and both a good fuel economy and good driveability are obtained. Further, at very high engine speeds (higher than 4,300 rpm), the EGR valve opening degree values in map G are determined so as to prevent the catalyst from degrading and to satisfy a good fuel economy and good driveability only (without increasing the amount of large molecular weight HC to an amount more than 800 ppm).

Then, at step 305, the EGR valve is driven so that the EGR valve opening degree (pulse step number) is SEGR.

Figure 6:
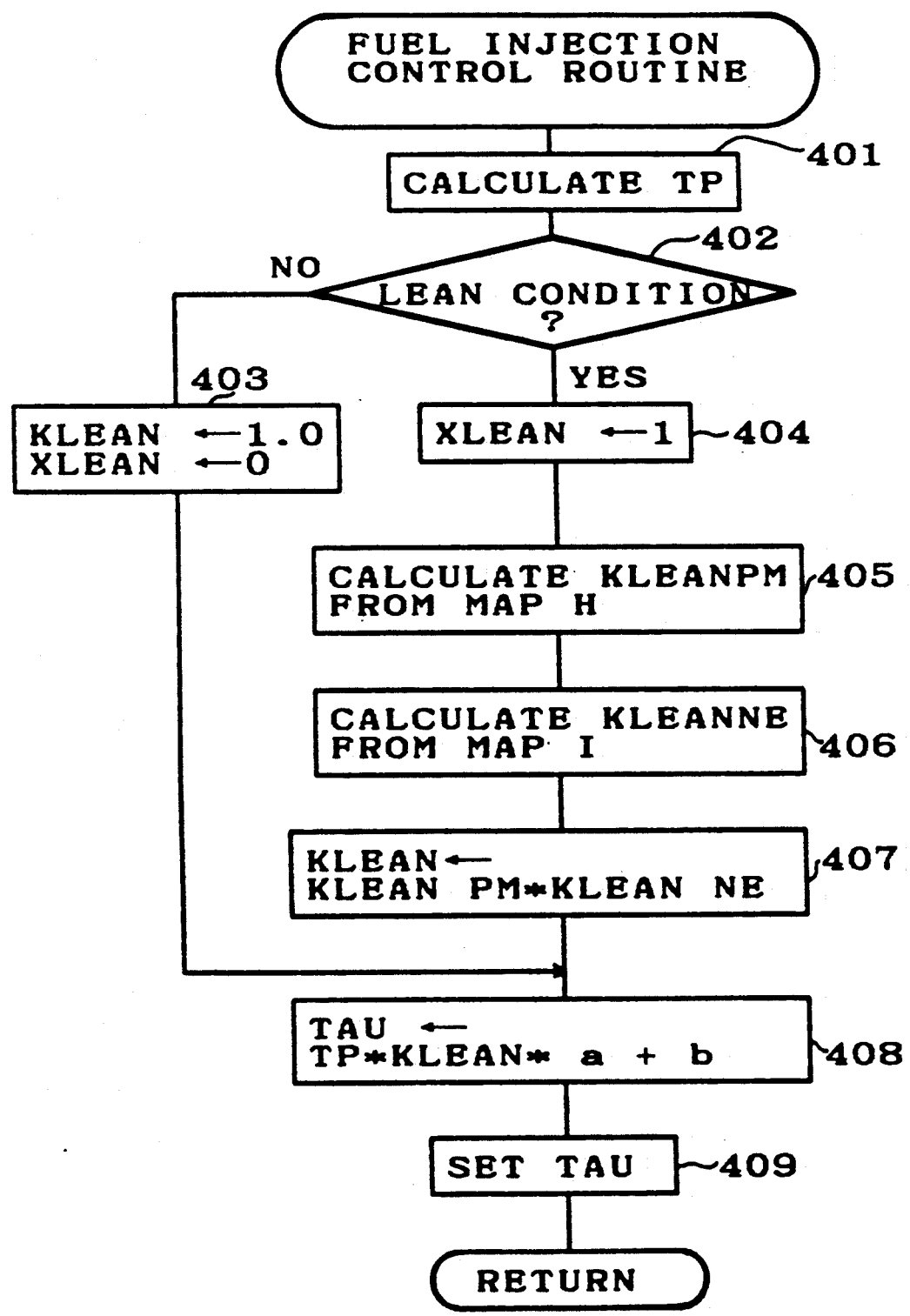
FIG. 6 is flow chart for fuel injection used in the control apparatus for an internal combustion engine in accordance with the fourth embodiment of the present invention.

FIG. 6 is a fuel injection amount control routine for the fourth embodiment and is entered at predetermined crank angles (for example, at every 30° C. crank angle). At step 401, a basic fuel injection amount TP is calculated based on PM, NE, and SEGR. More particularly, using a usual basic fuel injection amount TPB calculated from the two-dimensional PM-NE map and a basic fuel injection amount modification factor TPEGR calculated from SEGR, the basic fuel injection amount TP is calculated from the following equation:

TP=TPB * (1−TPEGR).

TPEGR depends on the EGR valve opening degree SEGR and the engine speed NE. For example, TPEGR is in proportion to SEGR and in inverse proportion to NE. This TPEGR is stored in the ROM. Due to the above-described procedure, a decrease in intake air amount due to execution of EGR is taken into account in the calculation of the basic fuel injection amount TP.

At step 402, it is determined whether or not the current engine operating condition is a lean operating condition. For example, when the engine cooling water temperature THW is determined to be higher than a predetermined value (for example, 80° C.), the operating condition can be considered to be a lean condition. When the operating condition is determined to be not a lean condition, the routine proceeds to step 403, and when the operating condition is determined to be a lean condition, the routine proceeds to step 404. At step 403, the lean modification factor KLEAN is set to 1.0 and XLEAN is set to 0. At step 404, XLEAN is set to 1 and then the routine proceeds to step 405.

At step 405, a modification factor KLEANPM is calculated based on PM using map H, and then the routine proceeds to step 406 where a modification factor KLEANNE is calculated based on NE using map I. At step 407, the lean modification factor KLEAN is calculated using the following equation:

KLEAN=KLEANPM * KLEANNE.

This KLEAN is a factor, obtained through experiment, for preventing occurrence of torque variation due to a shift to the lean side of the lean limit in the case where the EGR of map G is executed at basic lean air-fuel ratios which can satisfy both good fuel economy and good driveability when EGR is not executed. In this connection, when the EGR rate is high, the air-fuel ratio must be shifted to a richer side of the lean air-fuel range. More particularly, the air-fuel ratio is modified by KLEAN to the following air fuel ratios: at low engine speeds, to an air-fuel ratio which causes the exhaust gas temperature upstream of and in the vicinity of the lean NOx catalyst to be higher than 380° C.; at medium engine speeds, to an air-fuel ratio which causes the exhaust gas temperature upstream of and in the vicinity of the lean NOx catalyst to be lower than 520° C.; and, at high engine speeds, to a lean air-fuel ratio which prevents occurrence of torque fluctuation and causes the amount of large molecular weight HC to be larger than 800 ppm. The steps 405, 406, and 407, and map H and map I constitute the air-fuel ratio setting means 18 of FIG. 1 in the fourth embodiment.

Then, at step 408, a final fuel injection amount TAU is calculated using the following equation:

TAU=TP * KLEAN * a +b where,
a is a factor for warming-up modification, and
b is a factor for acceleration modification.
Then, at step 409, TAU is set. The remainder of the routine is the same as that of the first embodiment.

Operation of the fourth embodiment will now be explained. In the fourth embodiment also, in a high engine speed range where the exhaust gas temperature rises and the amount of large molecular weight HC is low, the EGR rate is increased so that the amount of large molecular weight HC is increased to effectively increase the NOx purification rate. In a low engine speed range, the EGR rate is increased and the air-fuel ratio is set to a richer portion of the lean air-fuel range so that the exhaust gas temperature rises whereby the catalyst temperature approaches the peak NOx purification rate temperature. At low engine speeds, since the EGR rate is high, the amount of NOx exhausted from the engine is decreased. In a medium engine speed range, since the EGR rate is decreased and the air-fuel ratio is set to the lean side of the lean-air fuel ratio range, the exhaust gas temperature is decreased so that the catalyst temperature approaches the peak NOx purification rate temperature. Though the HC concentration decreases and the NOx exhaust amount increases at medium engine speeds, the increase in the NOx purification rate due to the decrease in the exhaust gas temperature is larger so that the amount of NOx exhausted to the environment will decrease.

Though in the above description of the fourth embodiment EGR is executed in a lean operating condition range only, EGR may be executed at other operating conditions. More particularly, after XLEAN is determined to be 0 at step 303 of FIG. 5, an EGR valve opening degree SEGR accommodated to an operating condition other than the lean condition may be calculated.

In the present invention, utilizing the characteristic that the air-fuel ratio changes in accordance with a change in the EGR rate in a lean burn engine and the characteristic that the amount of large molecular weight HC increases in accordance with an increase in the EGR rate, the air-fuel ratio and the EGR rate are set to such an air-fuel ratio and an EGR rate as can cause the exhaust gas temperature to approach the peak NOx purification rate temperature of the lean NOx catalyst at low engine speeds, and the EGR rate is set to such an EGR rate as can cause the amount of large molecular weight HC in the exhaust gas to increase at high engine speeds, so that the EGR can be effectively utilized to increase the NOx purification rate of the lean NOx catalyst.

Although several embodiments of the invention have been described in detail above, it will be appreciated by those skilled in the art that various modifications and alterations can be made to the particular embodiments shown without materially daparting from the novel teachings and advantages of the present invention. Accordingly, it is to be understood that all such modifications and alterations are included within the spirit and scope of the present invention as defined by the following claims.

What is claimed is:

1. A control apparatus for an internal combustion engine, the engine being capable of fuel combustion at lean air-fuel ratios and having an exhaust conduit where a zeolite catalyst carrying at least one kind of metal selected from the group consisting of transition metals and noble metals and capable of reducing nitrogen oxides in an exhaust gas from the engine under oxidizing gas conditions is installed, the control apparatus comprising:
engine speed detecting means for detecting an engine speed;

EGR control means including EGR valve opening degree calculating means and EGR valve driving means, the EGR valve opening degree calculating means calculating an EGR valve opening degree based on air-fuel ratios which cause a current exhaust gas temperature to be within a predetermined temperature range at engine speeds lower than a predetermined engine speed and calculating an EGR valve opening degree which causes an amount of large molecular weight HC included in the exhaust gas to be more than a predetermined amount at engine speeds equal to or higher than the predetermined engine speed, the EGR valve driving means driving an EGR valve to the EGR valve opening degree calculated by the EGR valve opening degree calculating means; and air-fuel ratio control means including air-fuel ratio setting means for setting a current air-fuel ratio to a lean air-fuel ratio calculated based on the EGR valve opening degree.

2. A control apparatus for an internal combustion engine according to claim 1, wherein the EGR valve opening degree calculating means includes a map for calculating an EGR modification factor based on engine speed, in the map the EGR modification factor being set at a value equal to or larger than 1.0 at high engine speeds so that an EGR rate is increased and large molecular weight HC is included in the exhaust gas in an amount more than 800 ppm.

3. A control apparatus for an internal combustion engine according to claim 2, wherein in the map the EGR modification factor is set at 1.0 at very high engine speeds so that an exhaust gas temperature is prevented from rising to a temperature at which the zeolite catalyst is degraded due to heat.

4. A control apparatus for an internal combustion engine according to claim 1, wherein the EGR valve opening degree calculating means includes a map for calculating an EGR modification factor based on engine speed, in the map the EGR modification factor being set at a value greater than 1.0 at low engine speeds so that a current air-fuel ratio is controlled to an air-fuel ratio which causes an exhaust gas temperature upstream of and in the vicinity of the zeolite catalyst higher than 380° C.

5. A control apparatus for an internal combustion engine according to claim 1, wherein the EGR valve opening degree calculating means includes a map for calculating an EGR modification factor based on engine speed, in the map the EGR modification factor being set at a value less than 1.0 at medium engine speeds so that when an air-fuel ratio is set at a lean air-fuel ratio, an exhaust gas temperature is lower than 520° C.

6. A control apparatus for an internal combustion engine according to claim 1, wherein the air-fuel ratio setting means includes means for generating a lean modification factor based on a target EGR rate so that the air-fuel ratio is shifted toward a rich side of a lean air-fuel range.

7. A control apparatus for an internal combustion engine according to claim 1, wherein the EGR valve opening degree calculating means includes a map for calculating an EGR modification factor based on engine speed, in the map the EGR rate modification factor being set at 1.0 at low engine speeds so that fuel economy is improved at low engine speeds.

8. A control apparatus for an internal combustion engine according to claim 1, wherein the EGR valve opening degree calculating means includes a map for calculating an EGR modification factor based on engine speed and on engine load.

9. A control apparatus for an internal combustion engine according to claim 8, wherein the EGR modification factor is set at 1.0 at high engine loads so that engine power is increased at high engine speeds.

10. A control apparatus for an internal combustion engine according to claim 8, wherein the EGR modification factor is set at a value greater than 1.0 at engine speeds up to 1,200 rpm at medium engine loads and is set at a value greater than 1.0 at engine speeds up to 1,600 rpm at low engine loads.

11. A control apparatus for an internal combustion engine according to claim 8, wherein the EGR modification factor is set at a higher value at medium engine loads than at low engine loads in a high engine speed range so that a NOx purification rate of the zeolite catalyst can be increased at high and low engine loads.

12. A control apparatus for an internal combustion engine according to claim 1, wherein the EGR valve opening degree calculating means includes a map for calculating an EGR valve opening degree directly based on engine load and engine speed without calculating any EGR rate, in the map the EGR valve opening degree values being set so that ain a low engine speed range both a small torque fluctuation and a small NOx exhaust amount are satisfied when the current air-fuel ratio is set to an air-fuel ratio which causes an exhaust gas temperature to be higher than 380° C. upstream of and in the vicinity of the zeolite catalyst, so that in a medium engine speed range both a small torque fluctuation and a small NOx exhaust amount ar satisfied when the current air-fuel ratio is set to an air fuel ratio which causes the exhaust gas temperature to be lower than 520° C., and so that in a high engine speed range an amount of large molecular weight HC included in the exhaust gas is more than 800 ppm and both good fuel economy and good driveability are obtained.

13. A control apparatus for an internal combustion engine according to claim 12, wherein the air-fuel ratio setting means includes means for setting the current air-fuel ratio to an air-fuel ratio which causes an exhaust gas temperature upstream of and in the vicinity of the zeolite catalyst to be higher than 380° C. at low engine speeds, for setting the current air-fuel ratio to an air-fuel ratio which causes the exhaust gas temperature upstream of and in the vicinity of the zeolite catalyst to be less than 520° C. at medium engine speeds, and for setting the current air-fuel ratio to an air-fuel ratio which can prevent occurrence of torque variation at EGR valve opening degrees where a large molecular weight HC component amount in the exhaust gas is more than 800 ppm.

* * * * *